United States Patent [19]

Perlin

[11] 4,235,125
[45] Nov. 25, 1980

[54] AUTOMATIC STEPLESS TRANSMISSION
[76] Inventor: Rafael Perlin, 489 Georges St. #21, Magog, Quebec, Canada
[21] Appl. No.: 9,801
[22] Filed: Feb. 6, 1979
[51] Int. Cl.³ .............................................. F16H 7/06
[52] U.S. Cl. ................................................... 74/674
[58] Field of Search ...................... 74/674, 710, 710.5, 74/711, 713, 714, 715, 750 R, 751, 752 R, 752 A, 752 B, 752 C, 752 D, 752 E, 752 F

[56] References Cited
U.S. PATENT DOCUMENTS

| | | | |
|---|---|---|---|
| 3,888,138 | 6/1975 | Hiersig | 74/674 |
| 4,041,835 | 8/1977 | Isler | 74/674 |
| 4,122,731 | 10/1978 | Bendure et al. | 74/674 |

Primary Examiner—Patrick D. Lawson
Attorney, Agent, or Firm—Cushman, Darby & Cushman

[57] ABSTRACT

The disclosure herein describes an automatic stepless transmission with a continuously changing gear ratio; the transmission comprises two differential gear mechanisms interconnected through a pair of gear connections so that the power flow from the first differential gear mechanism to the second differential gear mechanism is divided into two components when the transmission is "in gear".

9 Claims, 3 Drawing Figures

AUTOMATIC STEPLESS TRANSMISSION

FIELD OF THE INVENTION

The present invention relates to an automatic stepless transmission.

BACKGROUND OF THE INVENTION

The existing transmission systems for converting torque from an input shaft to a load-varying output shaft operate on the step-by-step principle which consists of achieving a predetermined output speed by passing through a series of fixed speed levels. The number of steps required depends on the rotational speed of the drive shaft and the load actually applied to the output shaft.

In these presently existing transmission mechanisms, the power flow, when the transmission is "in gear", is a single stream either through different meshing gears and shafts (when in low gear) or, generally, through a direct drive connection (when in high gear). The transmission gear ratio is a constant, the ratio being the speed of the input shaft to the speed of the output shaft for that particular gear. Therefore, the value of each gear shift ratio in a standard transmission is a constant which is a function of all the individual gear pair ratios engaged at that moment. In other words, the connection between the engine and the driven wheels is fixed, since any change in the engine rotational speed entails a proportional change in the rotational speed of the wheels.

OBJECTS AND STATEMENTS OF THE INVENTION

It is an object of the present invention to provide an automatic stepless transmission wherein the gear shift ratio is continuously variable during the entire torque converting operation.

It is also an object of the present invention to provide an automatic stepless continuous transmission wherein the power flow is constantly divided into at least two components.

It is a further object of the present invention to provide an automatic transmission which has reduced size and weight in comparison to presently existing transmission systems.

The present invention therefore relates to an automatic stepless transmission for converting torque transmitted from an input shaft to a load-varying output shaft which comprises:

first differential gear means associated with the input shaft and receiving the torque;
second differential gear means associated with the output shaft;
torque-varying connection means between the first differential gear means and the second differential gear means;
second connection means between the first differential gear means and the second differential gear means; the torque received in the first differential gear means being divided and transmitted to the second differential gear means into two components: one component acting through the torque-varying connection means and the other applied to the second differential gear means;
the torque-varying connection means having a higher transmission ratio than that of the second connection means transmitting substantially all of the torque during first stages of operation; subsequently, the torque being gradually divided between the torque-varying connection means and the second connection means in proportion to the varying load conditions applied to the output shaft.

In a preferred embodiment of the invention, the differential gear means consists of bevel pinions and wheels while the torque-varying connection means are standard gear wheels.

In another embodiment of the invention, the differential gear means consists of a planetary gear system. There exist many embodiments of the above described invention which consist of either changing the points of application of the input torque or varying the interconnection of the different components of the differential gear mechanisms.

BRIEF DESCRIPTION OF THE DRAWINGS

The scope of applicability of the present invention will become apparent from the detailed description given hereinafter; it should be understood, however, that the detailed description, while indicating preferred embodiments of the invention, is given by way of illustration only since various changes and modifications within the spirit and scope of the invention will become apparent to those skilled in the art.

In The Drawings

DESCRIPTION OF PREFERRED EMBODIMENTS

Figure 1:
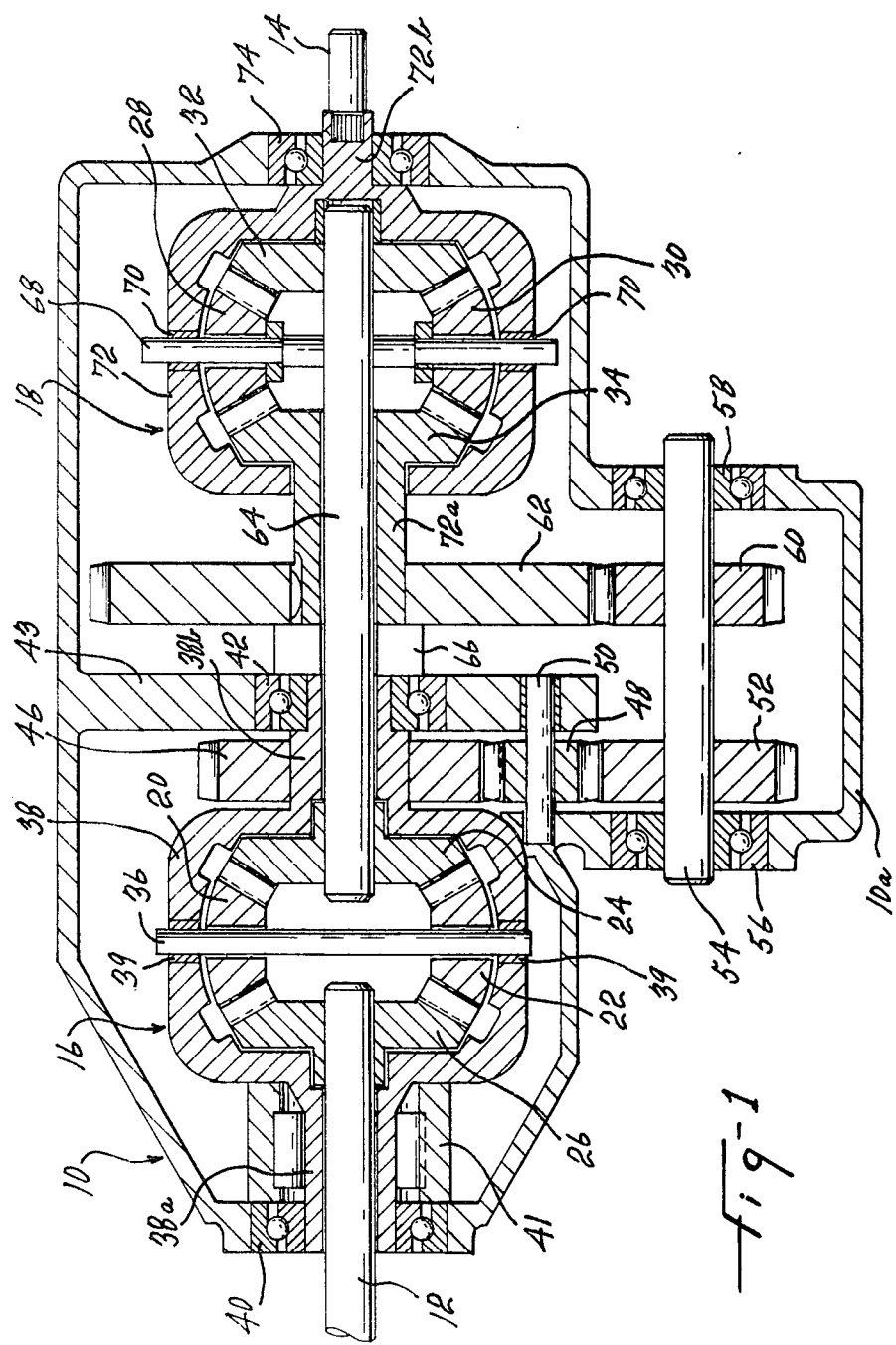
FIG. 1 is a cross-sectional view of an automatic stepless transmission made in accordance with the present invention.

Referring to FIG. 1 the transmission shown comprises a housing 10 into which extend an input shaft 12 at one end and an output shaft 14 at the other end.

The input shaft 12, called the driving shaft, is connected to a driving source, such as an engine (not shown). The output shaft is connected to an apparatus to be driven, such as the wheels of a vehicle which are subjects to variable load conditions, such as road resistance.

The housing encloses two differential gear mechanisms 16 and 18 respectively associated with the input drive shaft 12 and the output driven shaft 14.

In the embodiment illustrated in FIG. 1, the differential gear mechanism 16 includes a pair of bevel pinions 20, 22 and a pair of bevel wheels 24, 26 while the second differential gear mechanism 18 comprises two bevel pinions 28, 30 and two bevel wheels 32, 34.

The differential pinions 20, 22 are integral with a shaft 36 which, in turn, is rotatively mounted in a box 38 by means of slide bushings 39. The box 38 has an extension 38a rotatively attached to the housing 10 by means of roller bearings 40. A one-way clutch mechanism 41 allows rotation of the box 38 in one direction only. Bevel wheel 26 is journaled on input shaft 12. Box 38 includes another extension 38b which is rotatively mounted by means of roller bearings 42 to a wall 43 integral with housing 10. A first gear 46 of a torque-varying connection is fixed to extension 38b; this gear is engaged with a smaller gear 48 which is rotatively supported on a shaft 50 mounted for rotation in wall 43.

Gear 48 is in meshing engagement with a gear 52 mounted on a shaft 54 rotatively supported in the housing extension 10a by means of roller bearings 56, 58. Also mounted on shaft 54 is a smaller gear 60 in meshing engagement with a gear 62 of larger diameter.

A second connection between the first differential mechanism 16 and the second differential mechanism 18 is effected through shaft 64 which is connected, at one end, to bevel wheel 24 of the first differential gear mechanism and, at the other end, to the bevel wheel 32 of the second differential gear mechanism. A spacer bushing 66 is provided between the two differential gear mechanisms. Differential pinions 28, 30 of the second differential gear 18 are mounted on a shaft 68 which is adapted, by means of slide bushings 70, to rotate in a differential box 72. This box has an extension 72a in covering arrangement with shaft 64 and a second extension 72b rotatively mounted by means of roller bearings 74 in housing 10 and connected to the output shaft 14.

In operation, an input torque is received on input shaft 12 and bevel wheel 26. This torque is divided into two components. A first component acts through bevel pinions 20, 22, box 38, gears 46, 48, 52, 60, 64 and bevel wheel 34. The second component acts through bevel wheel 24, shaft 64 and bevel wheel 32. The gear shift ratio of the first connection system (gears 46, 48, 52, 60, 64) is greater than the second connection system (gears 24, 34) by the gear ratio of the gear wheels 46, 48, 52, 60 and 64 which is the maximum gear ratio. Also, the gear ratio of the second connection system which consists in a direct coupling between gears 24, 34 is the minimal gear ratio. Hence, the connection systems can either form individually or contribute together to the output torque. The resultant gear shift ratio depends on the amount of contribution from each system and the transformation of the input torque into the output torque. In other words, the driving gear shift ratio may be due, at any moment, either only to the first or to the second gear connection system, or to a combination of both depending on the load being applied to the output shaft and on the available input power. In the case of a combined contribution of each gear connection system, each resultant output gear shift has a different gear ratio value. Thus, during engine heavy loading (for example, vehicle start conditions or rough road conditions), the entire input power is transmitted through the first connection system of gears. The second connection system of gears 24, 34 comes into operation as soon as there is a decrease in the load applied to the output shaft; the contribution of the second gear system then gradually increases, thereby resulting in a decrease in the resultant gear shift ratio. This variation of the driving gear ratio is continuous and automatic and differs from presently known systems by the absence of stepped levels in the gear ratio changing; the change is gradual and continuous.

Figure 2:
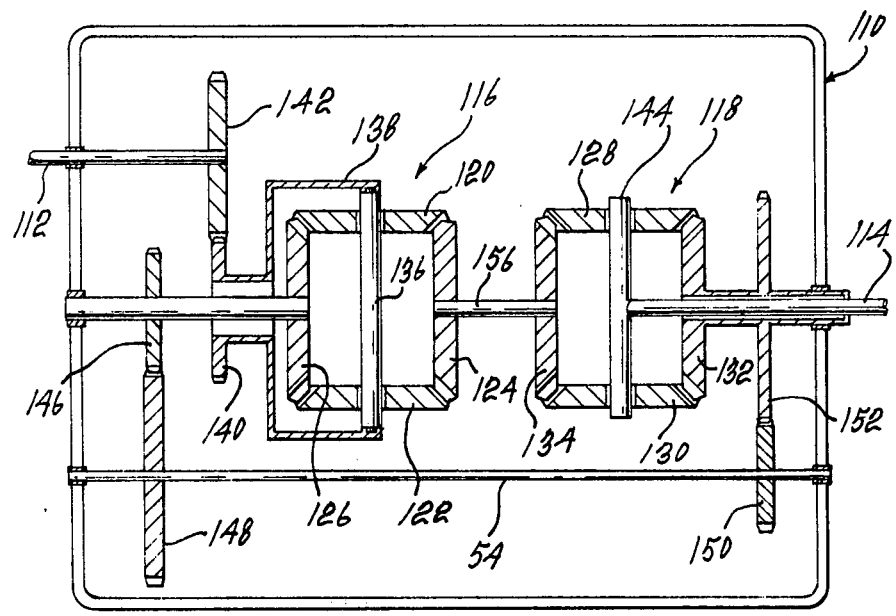
FIG. 2 is a schematic representation of another embodiment of the present invention.

Referring to FIG. 2, there is shown another embodiment of a stepless transmission in accordance with the present invention. In this embodiment a housing 110 into which extend an input shaft 112 and an output shaft 114, encloses two differential gear mechanisms 116, 118 respectively associated with the input drive shaft and the output driven shaft.

In the embodiment illustrated, the differential gear mechanism 116 includes a pair of bevel pinions 120, 122 and a pair of bevel wheels 124, 126 while the second differential gear mechanism also comprises two bevel pinions 128, 130 and two bevel wheels 132, 134.

The differential pinions 120 and 122 are integral with a shaft 136 which, in turn, is rotatively mounted in a case 138 which, in turn, is fixedly attached to a gear wheel 140 associated with the input drive shaft 112; in the embodiment illustrated, the gear wheel 140 is engaged with gear wheel 142 fixedly mounted on the input shaft 112.

The differential pinions 128 and 130 of the second differential gear are mounted on a rotatable shaft 144 which, in turn, is rigidly attached to the output drive shaft 114.

Torque transmission between the two differential gear mechanisms 116 and 118 is twofold. First, a torque changing gear connection is provided by means of gear wheels 146, 148, 150 and 152. Bevel pinion 126 is directly coupled to gear 146 which, in turn, meshes with gear 148. The latter is mounted on shaft 154 which also supports gear wheel 150, which meshes with gear wheel 152. The latter is directly coupled to bevel wheel 132 of the second differential gear mechanism 118.

The second connection between the two differential gear mechanisms is effected by link 156 between the differential pinion 124 of the first differential gear 116 and the bevel pinion 134 of the second differential gear 118.

In operation, an input torque is applied to the differential case 138 of the first differential mechanism 116 and is divided into two components. The first torque component acts through gears 126, 146, 148, 150, 152, 132 whereas the second torque component acts through gears 124 and 134. The differential case of the second differential gear mechanism 118 is the link connecting both torque components and produces the resultant output torque. The gear shift ratio of the first connection system (gears 126, 146, 148, 150, 152, 132) is greater than the second system of gears 124, 134 by th gear ratio of gear wheels 146, 148, 150 and 152 which is analogous to a standard gear shift transmission; it is the maximum gear ratio. Also, the gear ratio of the second connection system where there is a direct coupling between gears 124, 134 is the minimal gear ratio.

Figure 3:
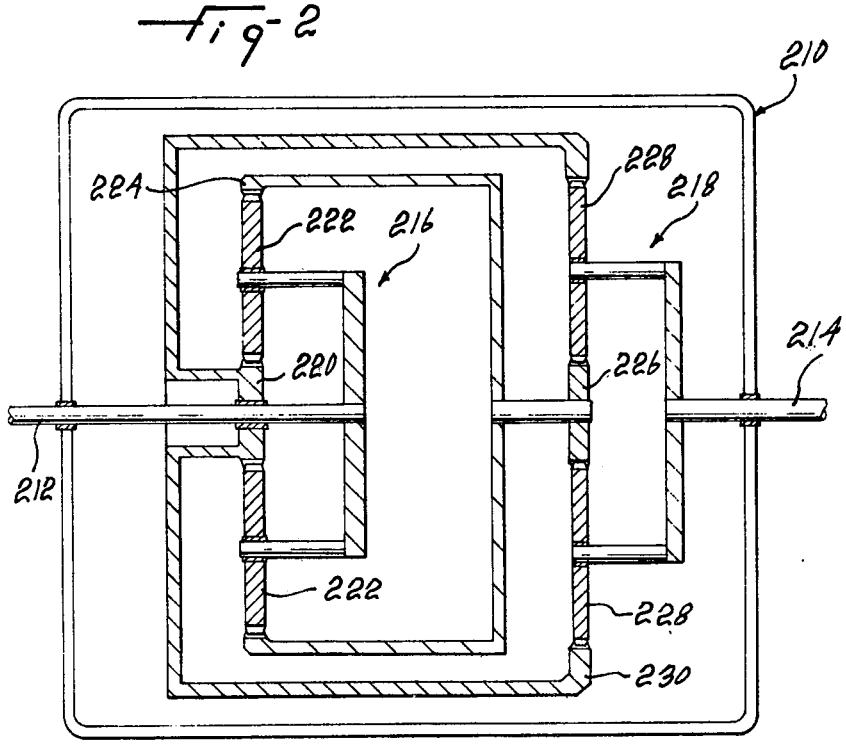
FIG. 3 is a schematic representation of another embodiment of the present invention.

Referring to FIG. 3, there is shown another embodiment of the present invention wherein the differential gear mechanisms included in the housing 210 make use of two planetary systems.

The first differential gear mechanism 216 includes a sun wheel 220, two planet wheels 222 which are connected to the input shaft 212 and an annulus 224 which is connected to the shaft of the sun wheel 226 of the second differential gear mechanism 218. The output shaft 214 is connected to two planet wheels 228 in gear meshing engagement with annulus 230 which is directly connected to the sun wheel 220 of the first differential gear mechanism.

In operation, torque applied to input shaft 212 is transmitted to planet wheels 222 from which it is divided into two components. For low gear, torque is transmitted via the planet wheels 222 and the sun wheel 220 of the first differential mechanism to the annulus 230 of the second differential mechanism and its planet wheels 228. As soon as the load on the output shaft 224 decreases, an additional torque route is obtained through planet wheels 222 and annulus 224 of the first differential mechanism 216 and sun wheel 226 and planet wheels 228 of the second differential mechanism 218.

Although the invention has been described above in connection with three specific forms, it will be evident to the man skilled in the art that it may be refined and modified in various ways. It is therefore wished to have it understood that the invention should not be limited in scope except by the terms of the following claims.

The embodiments of the invention in which an exclusive property or privilege is claimed are defined as follows:

1. An automatic stepless transmission for converting torque from an input shaft to a load-varying output shaft comprising:
   first differential gear means associated with said input shaft and receiving said torque;
   second differential gear means associated with said output shaft;
   torque-varying connection means between said first differential gear means and said second differential gear means;
   second connection means between said first differential gear means and said second differential gear means;
   said torque received in said first differential gear means being divided and transmitted to said second differential gear means into two components: a first torque component acting through said torque-varying connection means and a second torque component applied to said second differential gear means;
   said torque-varying connection means having a higher transmission ratio than that of said second connection means and transmitting substantially all of said torque during first stages of operation; subsequently, said torque being gradually divided between said torque-varying connection means and said second connection means in proportion to varying load conditions applied on said output shaft.

2. An automatic stepless transmission for converting torque transmitted from an input shaft to a load varying output shaft comprising:
   first differential gear means associated with said input shaft and receiving said torque;
   second differential gear means associated with said output shaft;
   torque-varying gear connection means between said first differential gear means and said second differential gear means;
   direct connection means between said first differential gear means and said second differential gear means allowing said torque received in said first differential gear means to be divided and transmitted to said second differential gear means into two components: a first torque component acting through said gear connection means and a second torque component applied directly to said direct connection means;
   said torque-varying gear connection means having a higher gear shift ratio than that of said direct connection means and transmitting at first substantially all of said torque; subsequently, said torque being gradually divided between said gear connection means and said direct connection means in proportion to varying load conditions applied on said output shaft.

3. An automatic stepless transmission as defined in claim 2, wherein said torque-varying gear connection means correspond to the maximum gear ratio of said transmission and wherein said direct connection means correspond to the minimal gear ratio of said transmission.

4. An automatic stepless transmission as defined in claim 2, wherein said first differential gear means include bevel pinion means associated with said input shaft, first bevel wheel means coupled to said speed reducing gear connection means and second bevel wheel means connected to second differential gear means.

5. An automatic stepless transmission as defined in claim 4, wherein said second differential gear means include bevel pinion means associated with said output shaft, first bevel wheel means connected to said speed reducing gear connection means, and second bevel wheel means connected to said second bevel wheel means of said first differential gear means.

6. An automatic stepless transmission as defined in claim 2, wherein said first differential gear means include: a first bevel wheel means associated with said input shaft, a second bevel wheel means connected to said second differential gear means, and bevel pinion means connected to said torque-varying connection means.

7. An automatic stepless transmission as defined in claim 6, wherein said second differential gear means include: a first bevel wheel means connected to said second bevel wheel means of said first differential gear means, a second bevel wheel means associated with said torque-varying gear connection means, and bevel pinion means associated with said output shaft.

8. An automatic stepless transmission as defined in claim 1, wherein said first and second differential gear means each include a planetary system each including a sun wheel, at least two planet wheels and an annulus.

9. An automatic stepless transmission as defined in claim 8, wherein said torque-varying connection means consist of said sun wheel of said first differential gear means coupled to said annulus of said second differential gear means and wherein said second connection means consist of said annulus of said first differential gear means coupled to said sun wheel of said second differential gear means; said input shaft being associated with said planet wheels of said first differential gear means and said output shaft being associated with said planet wheels of said second differential gear means.

* * * * *